United States Patent
Yi et al.

(10) Patent No.: US 9,402,181 B1
(45) Date of Patent: Jul. 26, 2016

(54) SYSTEMS AND METHODS FOR COMPLETING MULTI-FACTOR AUTHENTICATION VIA MOBILE DEVICES

(71) Applicant: Symantec Corporation, Mountain View, CA (US)

(72) Inventors: Liyu Yi, Fremont, CA (US); Mingliang Pei, Palo Alto, CA (US)

(73) Assignee: Symantec Corporation, Mountain View, CA (US)

( * ) Notice: Subject to any disclaimer, the term of this patent is extended or adjusted under 35 U.S.C. 154(b) by 64 days.

(21) Appl. No.: 14/448,517

(22) Filed: Jul. 31, 2014

(51) Int. Cl.
*H04W 12/06* (2009.01)
*H04L 29/06* (2006.01)

(52) U.S. Cl.
CPC .............. *H04W 12/06* (2013.01); *H04L 63/08* (2013.01)

(58) Field of Classification Search
None
See application file for complete search history.

(56) References Cited

U.S. PATENT DOCUMENTS

| | | | | | |
|---|---|---|---|---|---|
| 8,370,389 | B1* | 2/2013 | Dotan | ..................... | G06F 21/43 707/781 |
| 2004/0030753 | A1* | 2/2004 | Horvitz | ................. | H04W 4/028 709/206 |
| 2006/0120607 | A1* | 6/2006 | Lev | .......................... | G06F 21/32 382/217 |
| 2006/0287963 | A1* | 12/2006 | Steeves | ................ | G06Q 20/367 705/64 |
| 2008/0184267 | A1* | 7/2008 | Hochmuth | ............. | G06F 9/542 719/318 |
| 2011/0173681 | A1* | 7/2011 | Qureshi | ................ | H04W 12/06 726/4 |
| 2011/0247045 | A1* | 10/2011 | Rajagopal | ............... | H04L 63/08 726/1 |
| 2012/0295648 | A1* | 11/2012 | Naaman | ................ | H04W 4/027 455/500 |
| 2013/0122864 | A1* | 5/2013 | Haggerty | .............. | H04W 12/06 455/411 |

OTHER PUBLICATIONS

Scott Schneider, et al; Systems and Methods for Enabling Biometric Authentication Options; U.S. Appl. No. 14/178,276, filed Feb. 12, 2014.
Srinath Venkataramani, et al; Systems and Methods for Blocking Push Authentication Spam; U.S. Appl. No. 14/513,897, filed Oct. 14, 2014.
Zorn, G. et al., "Radius Attributes for Tunnel Protocol Support", http://www.ietf.org/rfc/rfc2868.txt, as accessed on Aug. 19, 2014, Network Working Group, Request for Comments: 2868, The Internet Society, (Jun. 2000).
"RADIUS", http://en.wikipedia.org/wiki/RADIUS, as accessed on Aug. 19, 2014, Wikipedia,(Dec. 9, 2003).
Chakrabarty, Amit "Symantec VIP Mobile Push Demo", http://www.symantec.com/connect/blogs/symantec-vip-mobile-push-demo, as accessed on Jun. 18, 2014, (Sep. 18, 2013).

* cited by examiner

*Primary Examiner* — Lester Kincaid
*Assistant Examiner* — Daniel G Bassett
(74) *Attorney, Agent, or Firm* — ALG Intellectual Property, LLC

(57) ABSTRACT

The disclosed computer-implemented method for completing multi-factor authentication via mobile devices may include (1) identifying a request to communicate with a user's mobile device to complete multi-factor authentication of the user to an online service, (2) determining that authentication notifications are disabled for attempts made by the user to login to the online service, (3) preventing an authentication notification from being displayed on the user's mobile device, (4) receiving an out-of-band authentication communication from a mobile device, (5) determining that the mobile device that sent the out-of-band authentication communication is the user's mobile device and is therefore trusted to complete the multi-factor authentication of the user to the online service, and (6) enabling the user to login to the online service and automatically receive future notification. Various other methods, systems, and computer-readable media are also disclosed.

20 Claims, 7 Drawing Sheets

SYSTEMS AND METHODS FOR COMPLETING MULTI-FACTOR AUTHENTICATION VIA MOBILE DEVICES

BACKGROUND

Security is often described as a continuum between convenience and safety. A system that requires ten layers of authentication may be very difficult to attack, but it may also be so inconvenient that it will never be used. At the opposite end, a system with no means of authentication or authorization is highly convenient for users but also highly insecure. Many systems now offer an option for two factor authentication, which requires an additional piece of information beyond or in place of the traditional username and password combination. Some two factor authentication systems may involve additional devices such as mobile phones and tablets. These two factor authentication systems may ask the user to enter a code sent to a mobile device or to take an action on the mobile device that is then transmitted back to an authentication server to complete the login process.

One downside of two factor authentication systems that involve mobile devices is that repeated illegitimate login attempts by malicious third parties may cause a flood of notifications to the mobile device, annoying users. Some traditional systems may allow a user to block notifications from being pushed to their mobile device. However, in these systems the user may be unaware that notifications are now being blocked and may become frustrated by the failure of their subsequent login attempts. Accordingly, the instant disclosure identifies and addresses a need for additional and improved systems and methods for completing multi-factor authentication via mobile devices.

SUMMARY

As will be described in greater detail below, the instant disclosure describes various systems and methods for completing multi-factor authentication via mobile devices by determining that authentication notifications are blocked for a mobile device, receiving a manually triggered communication from the mobile device confirming the authentication, and enabling completion of the multi-factor authentication process after receiving the communication from the mobile device. The systems described herein may also re-enable authentication notifications for the mobile device in response to receiving the manually triggered communication.

In one example, a computer-implemented method for completing multi-factor authentication via mobile devices may include (1) identifying a request to communicate with a user's mobile device to complete multi-factor authentication of the user to an online service, (2) determining that authentication notifications are disabled for attempts made by the user to login to the online service, (3) in response to determining that authentication notifications are disabled, preventing an authentication notification from being displayed on the user's mobile device, (4) receiving an out-of-band authentication communication from a mobile device, (5) determining that the mobile device that sent the out-of-band authentication communication is the user's mobile device and is therefore trusted to complete the multi-factor authentication of the user to the online service, and (6) in response to determining that the out-of-band authentication communication was received from a device trusted to complete the multi-factor authentication of the user to the online service, enabling the user to login to the online service.

In some examples, enabling the user to login to the online service may include enabling authentication notifications for attempts made by the user to login to the online service. Additionally or alternatively, the computer-implemented method may further include enabling authentication notifications for attempts made by the user to login to the online service in response to receiving a request from the user via the user's mobile device to enable authentication notifications.

In one embodiment, the computer-implemented method may further include displaying, at a web browser used by the user to initiate the multifactor authentication, a message that indicates that authentication notifications are disabled for attempts made by the user to login to the online service. For example, the message may be displayed on the login page of the online service. In some examples, the message may include instructions for the user to complete an out-of-band authentication action using a trusted device.

In some embodiments, preventing the authentication notification from being displayed on the mobile device may include queuing the authentication notification. In some examples, the computer-implemented method may further include expiring the queued authentication notification based on (1) receiving an additional authentication notification from the online service and/or (2) exceeding a predetermined time threshold for holding authentication notifications in the queue.

In one embodiment, the computer-implemented method may further include disabling authentication notifications for attempts made by the user to login to the online service in response to receiving a number of authentication requests from the online service that exceeds a predetermined threshold for authentication requests. Additionally or alternatively, the computer-implemented method may further include disabling authentication notifications for attempts made by the user to login to the online service in response to receiving a request from the user's mobile device to disable authentication notifications for the online service.

In one embodiment, the computer-implemented method may further include (1) identifying an additional request to communicate with the user's mobile device to complete multi-factor authentication of the user to the online service, (2) determining that authentication notifications are enabled for attempts made by the user to login to the online service, (3) in response to determining that authentication notifications are enabled, sending an authentication notification to the user's mobile device for display on the user's mobile device, (4) receiving an authentication communication from the user's mobile device sent in response to the authentication notification, and (5) in response to determining that the authentication communication was sent in response to the authentication notification, enabling the user to login to the online service.

In some examples, enabling the user to login to the online service may include automatically completing the multi-factor authentication of the user to the online service in response to receiving the out-of-band authentication communication from the mobile device and determining that the out-of-band authentication communication was received from a device that is trusted to complete the multi-factor authentication. In one embodiment, the out-of-band authentication communication from the mobile device may include a communication sent from an application on the mobile device that is associated with the multi-factor authentication of the user to the online service, and the out-of-band authentication communication may be sent in response to the user accessing the application on the mobile device.

In one embodiment, a system for implementing the above-described method may include (1) an identification module, stored in memory, that identifies a request to communicate with a user's mobile device to complete multi-factor authentication of the user to an online service, (2) a notification determination module, stored in memory, that determines that authentication notifications are disabled for attempts made by the user to login to the online service, (3) a prevention module, stored in memory, that prevents, in response to determining that authentication notifications are disabled, an authentication notification from being displayed on the user's mobile device, (4) a receiving module, stored in memory, that receives an out-of-band authentication communication from a mobile device, (5) a device determination module, stored in memory, that determines that the mobile device that sent the out-of-band authentication communication is the user's mobile device and is therefore trusted to complete the multi-factor authentication of the user to the online service, (6) an enabling module, stored in memory, that, in response to determining that the out-of-band authentication communication was received from a device trusted to complete the multi-factor authentication of the user to the online service, enables the user to login to the online service, and (7) at least one physical processor configured to execute the identification module, the notification determination module, the prevention module, the receiving module, the device determination module, and the enabling module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a request to communicate with a user's mobile device to complete multi-factor authentication of the user to an online service, (2) determine that authentication notifications are disabled for attempts made by the user to login to the online service, (3) prevent, in response to determining that authentication notifications are disabled, an authentication notification from being displayed on the user's mobile device, (4) receive an out-of-band authentication communication from a mobile device, (5) determine that the mobile device that sent the out-of-band authentication communication is the user's mobile device and is therefore trusted to complete the multi-factor authentication of the user to the online service, and (6) in response to determining that the out-of-band authentication communication was received from a device trusted to complete the multi-factor authentication of the user to the online service, enable the user to login to the online service.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
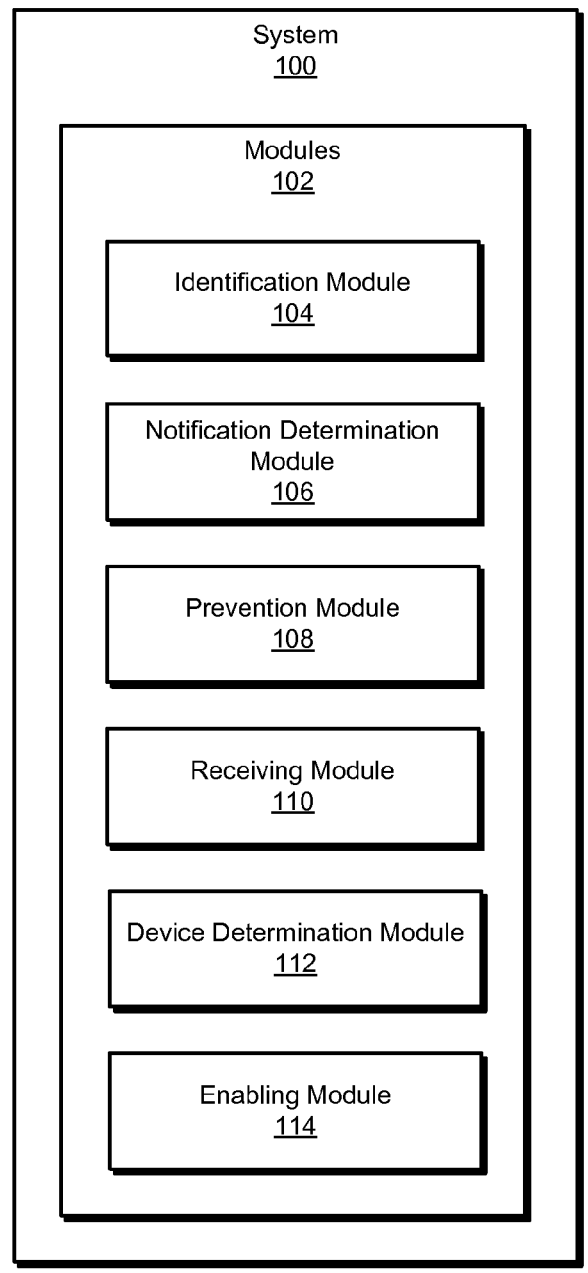
FIG. 1 is a block diagram of an exemplary system for completing multi-factor authentication via mobile devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for completing multi-factor authentication via mobile devices. As will be explained in greater detail below, by completing the multi-factor authentication process after receiving an out-of-band communication from a mobile device, the systems described herein may enable a user to complete a login process via their mobile device despite authentication notifications being turned off for the mobile device. Additionally, the systems described herein may re-enable authentication notifications for the mobile device after a successful authentication is completed, allowing a user to more conveniently complete future logins. The systems described herein may also display a message indicating the status of authentication notifications in a browser during the login process, informing the user that they must send an out-of-band communication and increasing the convenience and transparency of the multi-factor authentication process.

Figure 2:
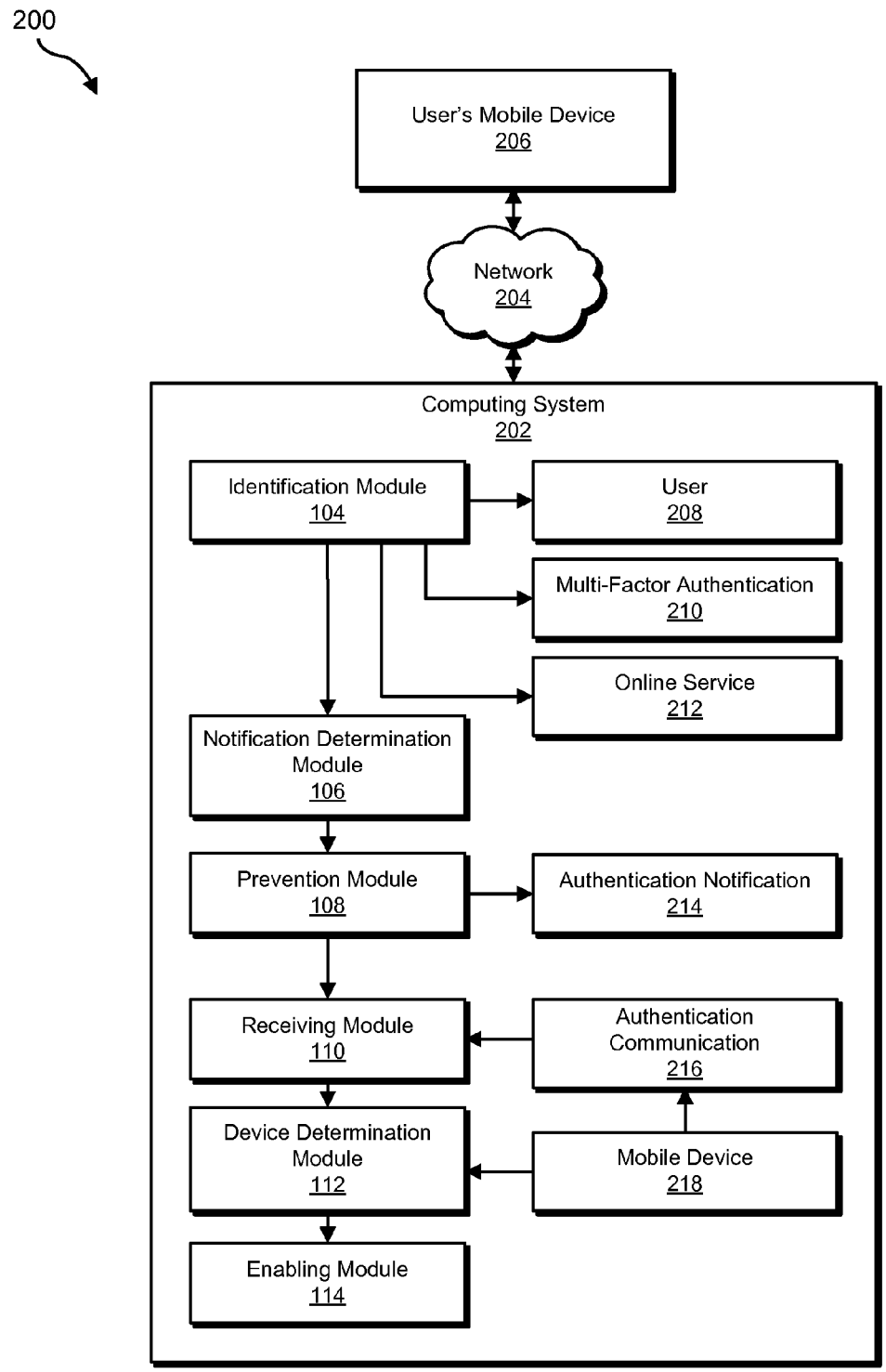
FIG. 2 is a block diagram of an additional exemplary system for completing multi-factor authentication via mobile devices.
Figure 3:
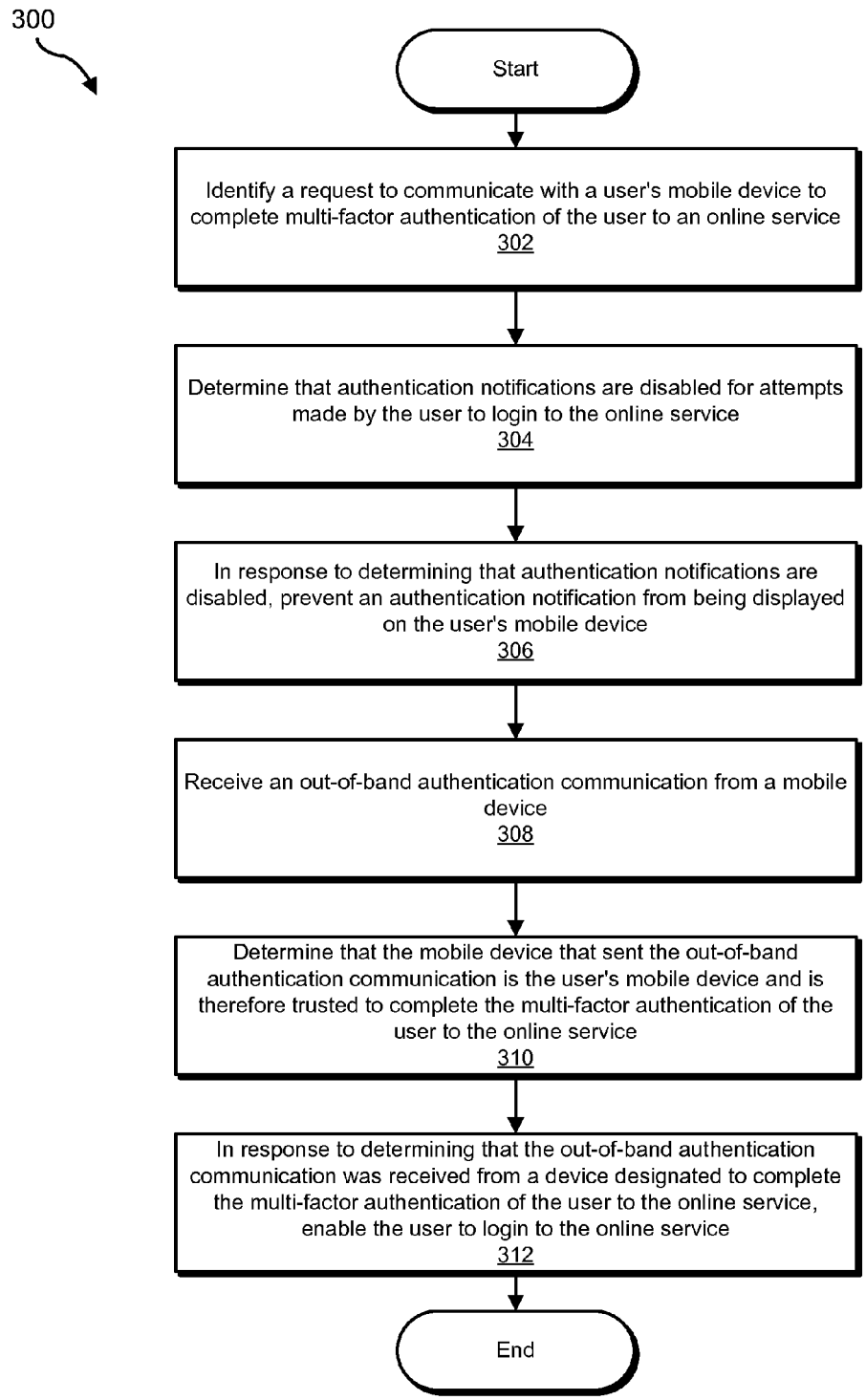
FIG. 3 is a flow diagram of an exemplary method for completing multi-factor authentication via mobile devices.
Figure 4:
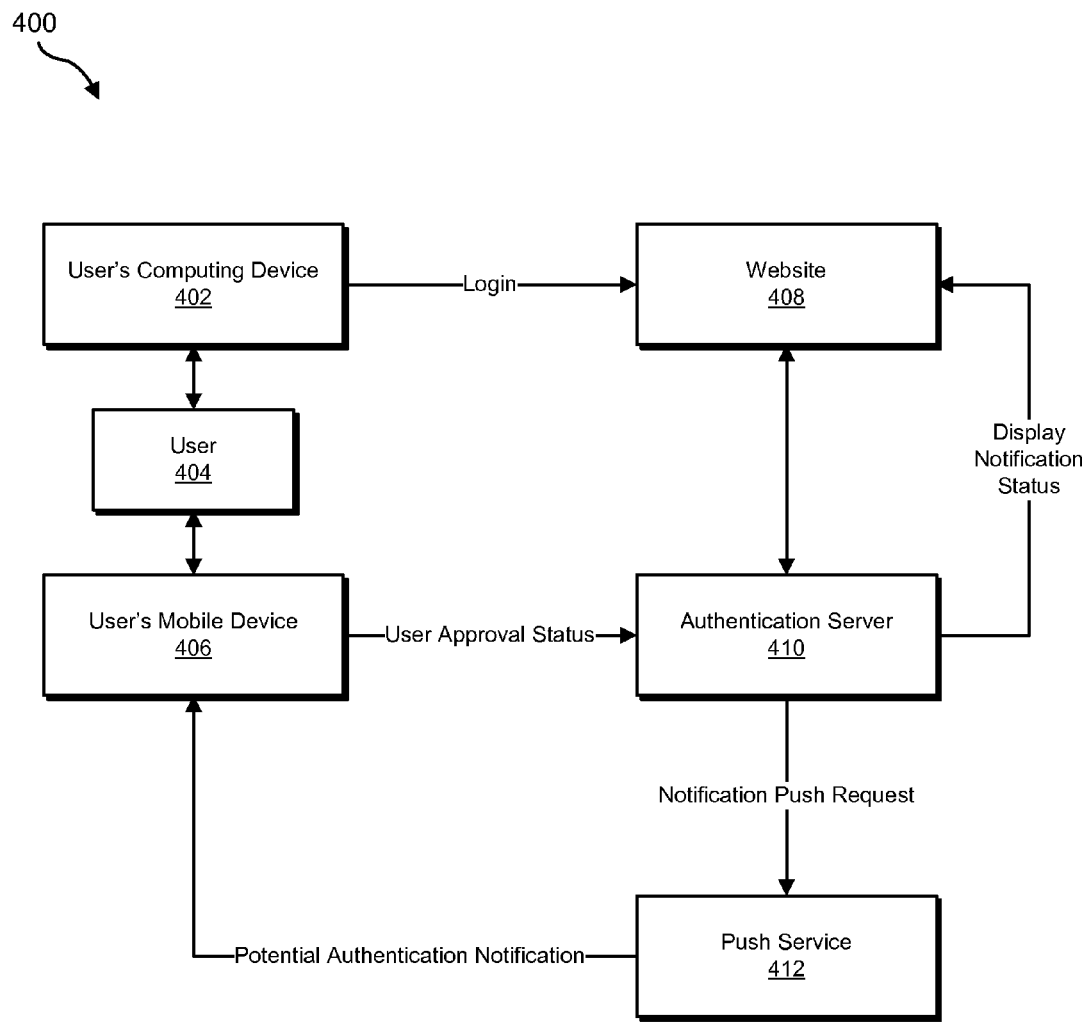
FIG. 4 is a block diagram of an exemplary computing system for completing multi-factor authentication via mobile devices.

The following will provide, with reference to FIGS. 1, 2, and 4, detailed descriptions of exemplary systems for completing multi-factor authentication via mobile devices. Detailed descriptions of corresponding computer-implemented methods will also be provided in connection with FIGS. 3 and 5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for completing multi-factor authentication via mobile devices. As illustrated in this figure, exemplary system 100 may include one or more modules 102 for performing one or more tasks. For example, and as will be explained in greater detail below, exemplary system 100 may include an identification module 104 that may identify a request to communicate with a user's mobile device to complete multi-factor authentication of the user to an online service. Exemplary system 100 may additionally include a notification determination module 106 that may determine that authentication notifications are disabled for attempts made by the user to login to the online service. Exemplary system 100 may also include a prevention module 108 that may prevent, in response to determining that authentication notifications are disabled, an authentication notification from being displayed on the user's mobile device.

Exemplary system 100 may additionally include a receiving module 110 that may receive an out-of-band authentication communication from a mobile device. Exemplary system 100 may also include a device determination module 112 that may determine that the mobile device that sent the out-of-band authentication communication may be the user's mobile device and may therefore be trusted to complete the multi-factor authentication of the user to the online service. Exemplary system 100 may additionally include an enabling module 114 that may, in response to determining that the out-of-band authentication communication was received from a device designated to complete the multi-factor authentication of the user to the online service, enable the user to login to the online service. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing system 202 and/or mobile device 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing system 202 in communication with a mobile device 206 via a network 204. In one example, computing system 202 may be programmed with one or more of modules. Additionally or alternatively, mobile device 206 may be programmed with one or more of modules 102.

In one embodiment, one or more of modules 102 from FIG. 1 may, when executed by at least one processor of computing system 202 and/or mobile device 206, enable computing system 202 and/or mobile device 206 to complete multi-factor authentication via mobile devices. For example, and as will be described in greater detail below, identification module 104 may identify a request to communicate with a user's mobile device 206 to complete multi-factor authentication 210 of user 208 to an online service 212. Next, notification determination module 106 may determine that authentication notifications are disabled for attempts made by user 208 to login to online service 212. Prevention module 108 may prevent, in response to determining that authentication notifications are disabled, an authentication notification 214 from being displayed on user's mobile device 206.

Despite authentication notification 214 being prevented, receiving module 110 may receive an authentication communication 216 from a mobile device 218 (e.g., the user may perform an action on mobile device 218 that triggers transmission of authentication communication 216). Device determination module 112 may determine that mobile device 218 that sent authentication communication 216 is user's mobile device 206 and is therefore trusted to complete multi-factor authentication 210 of user 208 to online service 212. Finally, enabling module 114 may, in response to determining that authentication communication 216 was received from a device trusted to complete multi-factor authentication 210 of user 208 to online service 212, enable user 208 to login to online service 212.

Computing system 202 generally represents any type or form of computing device or group of connected computing devices capable of reading computer-executable instructions. In some examples, computing system 202 may represent systems hosted on a variety of computing devices. For example, computing system 202 may include authentication servers and/or systems configured to process multi-factor authentication attempts, push notification systems configured to send notifications to mobile devices, and/or online services. Examples devices that may make up computing system 202 include, without limitation, laptops, tablets, desktops, servers, application servers, database servers, embedded systems, gaming consoles, combinations of one or more of the same, exemplary computing system 610 in FIG. 6, or any other suitable computing device.

Mobile device 206 generally represents any type or form of portable computing device capable of reading computer-executable instructions. Examples of mobile device 206 include, without limitation, laptops, tablets, e-readers, cellular phones, smart phones, Personal Digital Assistants (PDAs), wearable devices (e.g., smart watches, smart glasses, etc.), and/or combinations of one or more of the same. In some embodiments, mobile device 206 may include an application that provides an interface allowing a user to initiate an out-of-band authentication to receiving module 110. Other out-of-band communication methods may be also used from mobile device 206.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing system 202 and mobile device 206.

FIG. 3 is a flow diagram of an exemplary computer-implemented method 300 for completing multi-factor authentication via mobile devices. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a request to communicate with a user's mobile device to complete multi-factor authentication of the user to an online service. For example, at step 302 identification module 104 may, as part of computing system 202 in FIG. 2, identify a request to communicate with user's mobile device 206 to complete multi-factor authentication 210 of user 208 to online service 212.

The term "request," as used herein, generally refers to any communication sent from a computing device to another computing device. In some examples, a request may be sent from a mobile device to an online service. In other examples, a request may be sent from an online service to an authentication system as part of a multi-factor authentication. Additionally or alternatively, a request may be sent by an authentication server to a mobile push service. In one example, a request may be sent by an online service indicating that an authentication system should initiate a multi-factor authentication process.

The term "multi-factor authentication," as used herein, generally refers to any type of authentication process that involves more than one factor. In some embodiments, a multi-factor authentication process may involve multiple computing devices. For example, a multi-factor authentication process launched from a desktop computer may require a user to supply a username and/or password and may also require the user to authorize the login attempt from an additional device linked to their user account in order to log in.

The term "online service," as used herein, generally refers to any service provided via a network, such as the Internet, an enterprise network, a wide area network, a local area network, etc. An online service may include, without limitation, a website, a news feed, an application programming interface, a file server, a messaging application, a location service, and/or any other application that may send data via the Internet.

Identification module 104 may identify the request in a variety of ways and/or contexts. For example, identification module 104 may be part of an authentication service that is configured to send a request to communicate with a user's mobile device. In another example, identification module 104 may be part of a mobile push service that may receive a request. In some examples, identification module 104 may be part of an online service configured to handle authentication for the online service. Additionally or alternatively, identification module 104 may intercept a request generated by a service of which identification module 104 is not a part.

At step 304 one or more of the systems described herein may determine that authentication notifications are disabled for attempts made by the user to login to the online service. For example, at step 304 notification determination module 106 may, as part of computing system 202 in FIG. 2, determine that authentication notifications are disabled for attempts made by user 208 to login to online service 212.

The term "authentication notification," as used herein, generally refers to any message designed to alert a user that an authentication attempt with their credentials is taking place. For example, an authentication notification may be sent to a mobile device in response to a login attempt on another device. In some embodiments, an authentication notification may be part of a multi-factor authentication and/or may inform a user that further action on their part is required to complete an authentication process. For example, an authentication notification may provide a user with a code to enter into a login form and/or allow a user to click a button to send a message to the authentication service.

In some examples, an authentication notification may be triggered by an illegitimate authentication attempt. For example, a malicious actor may make repeated authentication attempts to a user's account in an attempt to brute force the account credentials. In this example, a user may receive numerous authentication notifications due to the repeated authentication attempts.

Notification determination module 106 may determine that authentication notifications are disabled in a variety of ways and/or contexts. For example, notification determination module 106 may include a flag and/or switch that may be set to "on" to allow notifications and to "off" to block notifications. In some examples, notification determination module 106 may be part of a notification push service.

In some embodiments, notification determination module 106 may maintain individual switches for each online service that uses the notification system. For example, an online shopping service may have the authentication notification switch set to off while an online banking service may have the authentication notification switch set to on. Additionally or alternatively, notification determination module 106 may maintain individual switches on a per-device basis. For example, notifications may be disabled for a user's mobile phone but enabled for the user's tablet.

In one embodiment, the systems described herein may include a display module that displays, at a web browser used by the user to initiate the multifactor authentication, a message that indicates that authentication notifications are disabled for attempts made by the user to login to the online service. In some examples, the message may include instructions for the user to complete an out-of-band communication. In some embodiments, the systems described herein may send a message to the online service indicating that a message should be displayed to the user. Additionally or alternatively, the systems described herein may include an authentication system for the online service.

In some examples, the message may inform the user that authentications are disabled for a specific mobile device and/or may inform the user of how to continue the authentication process. In one example, the message may appear in the same web browser window that the user is using to log in to the online service. In another example, the message may appear in a pop-up window generated by the online service and/or the authentication service.

At step 306 one or more of the systems described herein may prevent, in response to determining that authentication notifications are disabled, an authentication notification from being displayed on the user's mobile device. For example, at step 306 prevention module 108 may, as part of computing system 202 in FIG. 2, prevent, in response to determining that authentication notifications are disabled, authentication notification 214 from being displayed on user's mobile device 206.

Prevention module 108 may prevent the authentication notification from being displayed in a variety of ways and/or contexts. In one embodiment, prevention module 108 may be a part of a notification push service that may be responsible for sending authentication notifications and may prevent the authentication notification by not generating and/or not sending the authentication notification. In some embodiments, prevention module 108 may prevent an authentication notification by refraining from instructing a push service to send the authentication notification. In another embodiment, prevention module 108 may not be a part of a notification push service and may intercept an authentication notification sent by a notification push service. Additionally or alternatively, prevention module 108 may intercept and/or block a notification request sent by an authentication service to a notification push service.

In some examples, prevention module 108 may prevent the authentication notification from being displayed on the mobile device by queuing the authentication notification. In some embodiments, prevention module 108 may store the authentication notification in a queue at the authentication server. In another embodiment, prevention module 108 may store the authentication notification in a queue at the notification push service. Additionally or alternatively, prevention module 108 may store the authentication notification in a queue in an application on the mobile device. In some embodiments, prevention module 108 may queue a request that triggers an authentication notification in place of or in addition to queuing the authentication notification itself.

In some examples, systems described herein may include an expiring module that expires the queued authentication notification based on receiving an additional authentication notification from the online service and/or exceeding a predetermined time threshold for holding authentication notifications in the queue. For example, the systems described herein may hold only one authentication notification from a given online service in a queue at once and therefore may immediately expire a queued authentication notification after receiving an additional authentication notification from the same service. Additionally or alternatively, the systems described herein may expire authentication notifications after a preset time limit, such as three minutes, fifteen minutes, one hour, or one day.

At step 308 one or more of the systems described herein may receive an out-of-band authentication communication from a mobile device. For example, at step 308 receiving module 110 may, as part of computing system 202 in FIG. 2, receive an authentication communication 216 from mobile device 218.

The term "out-of-band authentication communication," as used herein, generally refers to any communication sent to an authentication server by a mobile device that does not directly respond to a communication sent successfully to the mobile device from the authentication server. For example, an authentication server may normally send an authentication notification to a mobile device but the authentication notification may be prevented (i.e., the authentication server may refrain from sending the notification). In this example, a user of the mobile device may manually confirm authentication via a user interface in an application in the mobile device, thereby sending or triggering an out-of-band authentication communication from the mobile device to the authentication server.

Receiving module 110 may receive the out-of-band authentication communication in a variety of ways. For example, receiving module 110 may be part of an authentication server and may receive a message directed to the authentication server by an authentication application on a mobile device.

In some embodiments, a user may send the out-of-band communication from the mobile device by enabling authentication notifications from an authentication application on the mobile device and then interacting with a queued authentication notification sent to the mobile device in response to authentication notifications being re-enabled. Additionally or alternatively, an out-of-band communication may be automatically triggered when a user opens and/or accesses an application associated with the authentication process (e.g., an application associated with the online service, an application used to perform multifactor authentication, etc.).

At step 310 one or more of the systems described herein may determine that the mobile device that sent the out-of-band authentication communication is the user's mobile device and is therefore trusted to complete the multi-factor authentication of the user to the online service. For example, at step 310 device determination module 112 may, as part of computing system 202 in FIG. 2, determine that the mobile device that sent authentication communication 216 is mobile device 206 and is therefore trusted to complete multi-factor authentication 210 of user 208 to online service 212.

Device determination module 112 may determine that the mobile device that sent the authentication notification is trusted in a variety of ways. For example, device determination module 112 may match the mobile device against a list of mobile device trusted to complete multi-factor authentication operations for the user. In some examples, device determination module 112 may use a device identifier to determine that the mobile device that sent the authentication communication is the same mobile device to which an authentication notification would have been sent if authentication notifications were enabled. Additionally or alternatively, device determination module 112 may identify a token in the authentication communication that indicates that the mobile device sending the authentication communication is trusted.

At step 312 one or more of the systems described herein may, in response to determining that the out-of-band authentication communication was received from a device trusted to complete the multi-factor authentication of the user to the online service, enable the user to login to the online service. For example, at step 312 enabling module 114 may, as part of computing system 202 in FIG. 2 and in response to determining that authentication communication 216 was received from a device designated to complete multi-factor authentication 210 of user 208 to online service 212, enable user 208 to login to online service 212.

Enabling module 114 may enable the user to login to the online service in a variety of ways. In some examples, enabling module 114 may enable the user to login to the online service by automatically completing the multi-factor authentication of the user to the online service in response to receiving the out-of-band authentication communication from the mobile device and determining that the out-of-band authentication communication was received from a device that is trusted to complete the multi-factor authentication. In these examples, receiving an authentication communication from a mobile device may be the last step of the login process.

In one embodiment, the out-of-band authentication communication from the mobile device may include a communication sent from an application on the mobile device that is associated with the multi-factor authentication of the user to the online service and the out-of-band authentication communication may be sent in response to the user accessing the application on the mobile device. For example, a user may be attempting to login to a website that may display a message informing the user that authentication notifications for the website are disabled and/or that the user may need to access an authentication application on a mobile device to complete the login process. In this example, the user may then access the authentication application and may use the authentication application to send an authentication communication. In one embodiment, a user may send an authentication communication with a one-click hot key set in a mobile device.

In some embodiments, the systems described herein may include and/or communicate with a user's computing device, a user's mobile device, an authentication server, a push service, and/or a website. FIG. 4 is a block diagram of an exemplary computing system 400 for completing multi-factor authentication via mobile devices. As illustrated in FIG. 4, a user 404 may be associated with both a user's computing device 402 and a user's mobile device 406. User 404 may use computing device 402 (e.g., a desktop computer, a laptop computer, an additional mobile device such as a tablet, etc.) to attempt to login to a website 408. Website 408 may have multi-factor authentication enabled and may communicate with an authentication server 410. Authentication server 410 may send a notification push request to a push service 412.

In some examples, authentication server 410 may determine the notification status for the user's mobile device 406 and/or may send a message to website 408 instructing website 408 to display the notification status to user 404. If authentication notifications are enabled, push service 414 may send an authentication notification to mobile device 406. User 404 may then approve the authentication attempt via mobile device 406 and mobile device 406 may transmit that information to authentication server 410. Authentication server 410 may then send a message to website 408 indicating that the multi-factor authentication process has been successfully completed.

Figure 5:
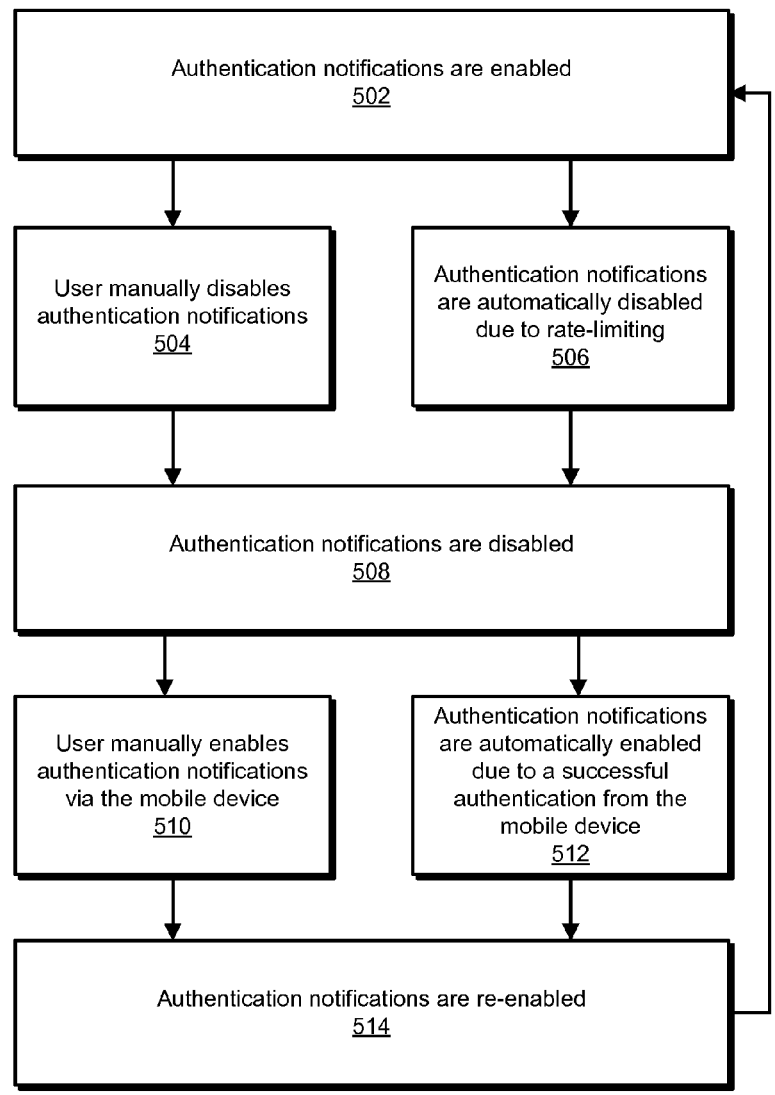
FIG. 5 is a flow diagram of an exemplary method for completing multi-factor authentication via mobile devices.

The systems described herein may enable and/or disable authentication notifications sent to a mobile device on behalf of an online service in a variety of ways. FIG. 5 is a flow diagram of an exemplary method for enabling or disabling authentication notifications while completing multi-factor authentication via mobile devices. As illustrated in FIG. 5, at step 502, authentication notifications may be enabled. From there, authentication notifications may be disabled in several ways.

At step 504, a user may manually disable authentication notifications. In some examples, systems described herein may disable authentication notifications for attempts made by the user to login to the online service in response to receiving a request from the user's mobile device to disable authentication notifications for the online service. For example, a user may access an authentication application on a mobile device and may change a setting on the authentication application to disable authentication notifications for the mobile device.

Additionally or alternatively, as shown at step 506, authentication may be automatically disabled due to rate-limiting. In one embodiment, the systems described herein may disable authentication notifications for attempts made by the user to login to the online service in response to receiving a number of authentication requests from the online service that exceeds a predetermined threshold for authentication requests. In some examples, a predetermined threshold for authentication requests from an online service may be a fixed number such as three, five, or ten. In other examples, a predetermined threshold may also be based on a time component. For example, five authentication requests in the span of ten minutes may trigger the systems described herein to disable authentication notifications while five authentication requests in the span of a day may not affect whether notifications are enabled.

Additionally or alternatively, a user may disable authentication notifications in a variety of other ways such as changing a setting in an online service via a browser and/or contacting a customer service representative. In some embodiments, authentication notifications may be disabled by a disabling module configured to disable authentication notifications in any or all of the ways described above.

At step 508, regardless of what method was used to disable authentication notifications, authentication notifications may be disabled. Authentication notifications may be re-enabled in any of a variety of ways.

At step 510, a user may manually enable authentication notifications via a mobile device. In some examples, systems described herein may enable authentication notifications for attempts made by the user to login to the online service in response to receiving a request from the user via the user's mobile device to enable authentication notifications. For example, a user may change a setting in an authentication application on a mobile device to enable authentication notifications for the mobile device from an online service.

At step 512, authentication notifications may be automatically enabled due to a successful authentication from the mobile device. In some embodiments, enabling module 114 may enable the user to login to the online service and may also enable authentication notifications for attempts made by the user to login to the online service. In some examples, enabling module 114 may always enable authentication notifications to a mobile device from an online service as a result of a successful login to the online service via the mobile device.

Additionally or alternatively, a user may enable authentication notifications in a variety of other ways such as changing a setting in an online service via a browser and/or contacting a customer service representative.

At step 514, authentication notifications may be re-enabled. From there, the process may repeat and authentication notifications may be disabled and/or re-enabled any number of times in any manner.

If authentication notifications are enabled, the multi-factor authentication process may proceed differently than if authentication notifications are disabled. In one embodiment, systems described herein may perform the following steps: (1) identifying an additional request to communicate with the user's mobile device to complete multi-factor authentication of the user to the online service, (2) determining that authentication notifications are enabled for attempts made by the user to login to the online service, (3) in response to determining that authentication notifications are enabled, sending an authentication notification to the user's mobile device for display on the user's mobile device, (4) receiving an authentication communication from the user's mobile device sent in response to the authentication notification, and (5) in response to determining that the authentication communication was sent in response to the authentication notification, enabling the user to login to the online service.

As explained above in connection with method 300, the systems described herein may complete multi-factor authentication via mobile devices while allowing users greater control of whether or not authentication notifications are sent to their mobile devices. A user may initiate a login attempt for a website from a computing device and may see a message indicating the status of authentication notifications from the website. If authentication notifications are disabled, a user may enable them from an application on their mobile device. If an authentication notification was blocked and held in a queue, it may be sent to the mobile device once authentication notifications are enabled. A user may then respond to an authentication notification on their mobile device and/or may complete the login process via an application on their mobile device. In some examples, authentication notifications for the mobile device may be automatically re-enabled if a user completes the authentication process via the mobile device without manually re-enabling authentication notifications. By displaying the status of authentication notifications to users via the browser and allowing users to enable and disable authentication notifications from mobile devices, the systems described herein may allow users to more conveniently and transparently manage authentication notifications while avoiding being spammed by unwanted notifications, thus increasing the convenience of multi-factor authentication systems.

Figure 6:
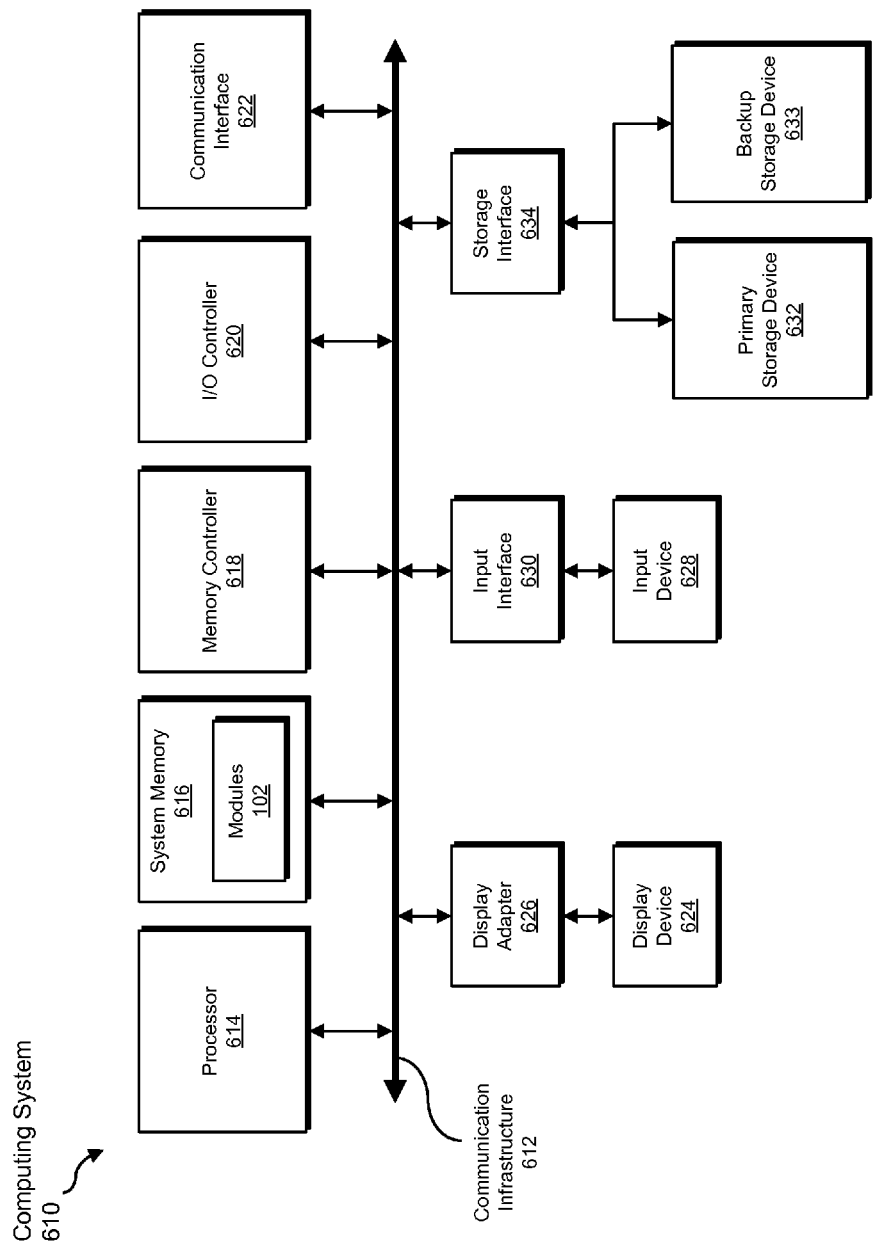
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
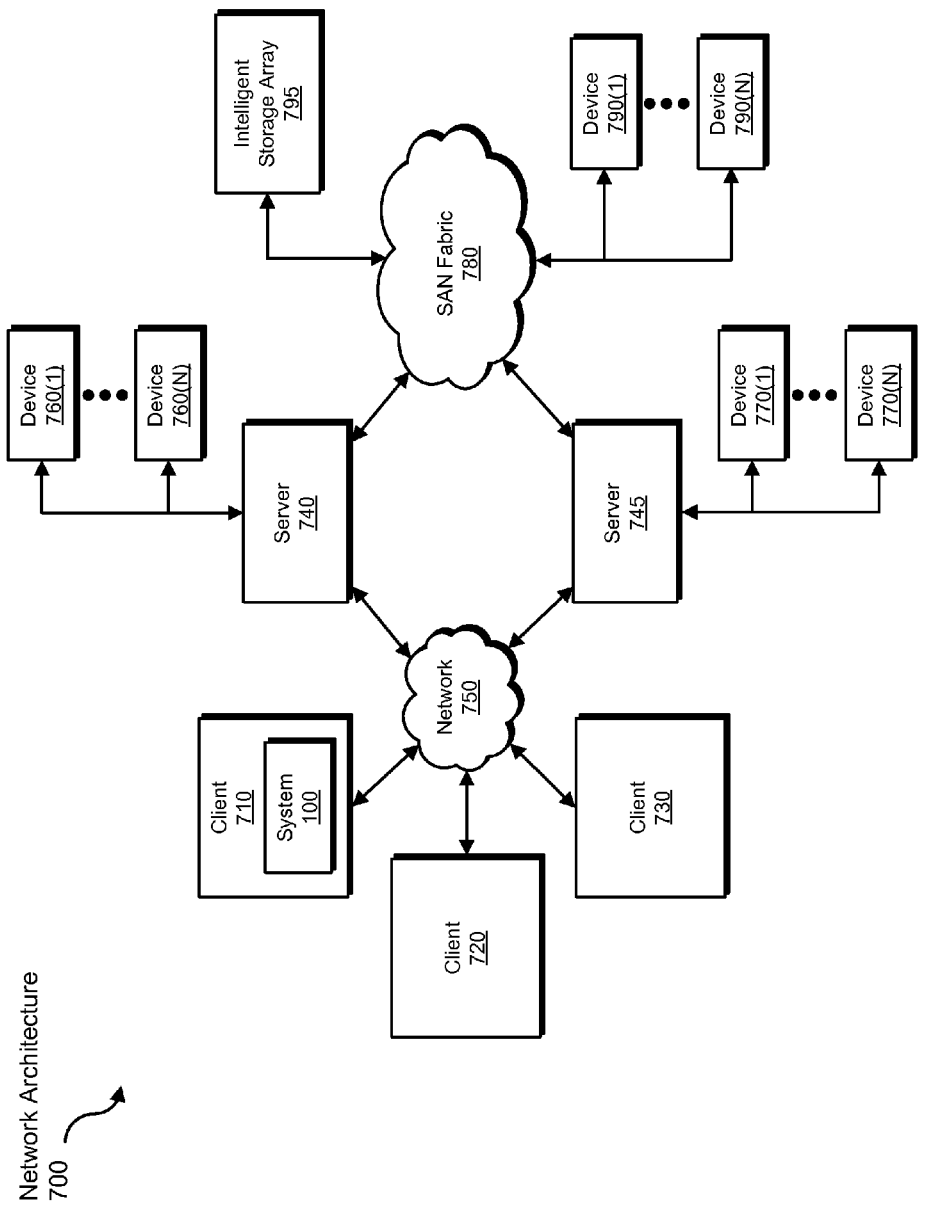
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790 (1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for completing multi-factor authentication via mobile devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/ or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive authentication notification request data to be transformed, transform the authentication notification request data, output a result of the transformation to a notification push service, use the result of the transformation to determine whether to send or queue an authentication notification, and store the result of the transformation to a queue. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for completing multi-factor authentication via mobile devices, at least a portion of the method being performed by a computing device comprising at least one processor, the method comprising:
    identifying a request to communicate with a user's mobile device to complete multi-factor authentication of the user to an online service;
    determining that authentication notifications are disabled for attempts made by the user to login to the online service;
    in response to determining that authentication notifications are disabled, preventing an authentication notification from being displayed on the user's mobile device;
    receiving an out-of-band authentication communication from the user's mobile device that was prevented from displaying the authentication notification;
    determining that the user's mobile device that sent the out-of-band authentication communication is the same user's mobile device that was prevented from displaying the authentication notification and is therefore trusted to complete the multi-factor authentication of the user to the online service;
    in response to determining that the out-of-band authentication communication was received from a device trusted to complete the multi-factor authentication of the user to the online service, enabling the user to login to the online service.

2. The computer-implemented method of claim 1, wherein enabling the user to login to the online service comprises enabling authentication notifications for attempts made by the user to login to the online service.

3. The computer-implemented method of claim 1, further comprising displaying, at a web browser used by the user to initiate the multifactor authentication, a message that indicates that authentication notifications are disabled for attempts made by the user to login to the online service and/or additional instructions for the user to initiate out-of-band authentication from a trusted device.

4. The computer-implemented method of claim 1, wherein preventing the authentication notification from being displayed on the mobile device comprises queuing the authentication notification.

5. The computer-implemented method of claim 4, further comprising expiring the queued authentication notification based on at least one of:
    receiving an additional authentication notification from the online service;
    exceeding a predetermined time threshold for holding authentication notifications in the queue.

6. The computer-implemented method of claim 1, further comprising enabling authentication notifications for attempts made by the user to login to the online service in response to receiving a request from the user via the user's mobile device to enable authentication notifications.

7. The computer-implemented method of claim 1, further comprising disabling authentication notifications for attempts made by the user to login to the online service in response to receiving a number of authentication requests from the online service that exceeds a predetermined threshold for authentication requests.

8. The computer-implemented method of claim 1, further comprising disabling authentication notifications for attempts made by the user to login to the online service in response to receiving a request from the user's mobile device to disable authentication notifications for the online service.

9. The computer-implemented method of claim 1, further comprising:
    identifying an additional request to communicate with the user's mobile device to complete multi-factor authentication of the user to the online service;
    determining that authentication notifications are enabled for attempts made by the user to login to the online service;
    in response to determining that authentication notifications are enabled, sending an authentication notification to the user's mobile device for display on the user's mobile device;
    receiving an authentication communication from the user's mobile device sent in response to the authentication notification;
    in response to determining that the authentication communication was sent in response to the authentication notification, enabling the user to login to the online service.

10. The computer-implemented method of claim 1, wherein enabling the user to login to the online service comprises automatically completing the multi-factor authentication of the user to the online service in response to receiving the out-of-band authentication communication from the mobile device and determining that the out-of-band authentication communication was received from a device that is trusted to complete the multi-factor authentication.

11. The computer-implemented method of claim 1, wherein:
    the out-of-band authentication communication from the mobile device comprises a communication sent from an application on the mobile device that is associated with the multi-factor authentication of the user to the online service;
    the out-of-band authentication communication is sent in response to the user accessing the application on the mobile device.

12. A system for completing multi-factor authentication via mobile devices, the system comprising:

an identification module, stored in memory, that identifies a request to communicate with a user's mobile device to complete multi-factor authentication of the user to an online service;

a notification determination module, stored in memory, that determines that authentication notifications are disabled for attempts made by the user to login to the online service;

a prevention module, stored in memory, that prevents, in response to determining that authentication notifications are disabled, an authentication notification from being displayed on the user's mobile device;

a receiving module, stored in memory, that receives an out-of-band authentication communication from the user's mobile device that was prevented from displaying the authentication notification;

a device determination module, stored in memory, that determines that the mobile device that sent the out-of-band authentication communication is the same user's mobile device that was prevented from displaying the authentication notification and is therefore trusted to complete the multi-factor authentication of the user to the online service;

an enabling module, stored in memory, that, in response to determining that the out-of-band authentication communication was received from a device trusted to complete the multi-factor authentication of the user to the online service, enables the user to login to the online service;

at least one physical processor configured to execute the identification module, the notification determination module, the prevention module, the receiving module, the device determination module, and the enabling module.

13. The system of claim 12, wherein the enabling module enables the user to login to the online service by enabling authentication notifications for attempts made by the user to login to the online service.

14. The system of claim 12, further comprising a displaying module, stored in memory, that displays, at a web browser used by the user to initiate the multifactor authentication, a message that indicates that authentication notifications are disabled for attempts made by the user to login to the online service and/or instructions for the user to initiate out-of-band authentication from a trusted device.

15. The system of claim 12, wherein the prevention module prevents the authentication notification from being displayed on the mobile device by queuing the authentication notification.

16. The system of claim 15, further comprising an expiring module, stored in memory, that expires the queued authentication notification based on at least one of:
   receiving an additional authentication notification from the online service;
   exceeding a predetermined time threshold for holding authentication notifications in the queue.

17. The system of claim 12, the enabling module enables authentication notifications for attempts made by the user to login to the online service in response to receiving a request from the user via the user's mobile device to enable authentication notifications.

18. The system of claim 12, further comprising a disabling module, stored in memory, that disables authentication notifications for attempts made by the user to login to the online service in response to receiving a number of authentication requests from the online service that exceeds a predetermined threshold for authentication requests.

19. The system of claim 12, further comprising a disabling module, stored in memory, that disables authentication notifications for attempts made by the user to login to the online service in response to receiving a request from the user's mobile device to disable authentication notifications for the online service.

20. A non-transitory computer-readable medium comprising one or more computer-readable instructions that, when executed by at least one processor of a computing device, cause the computing device to:
   identify a request to communicate with a user's mobile device to complete multi-factor authentication of the user to an online service;
   determine that authentication notifications are disabled for attempts made by the user to login to the online service;
   in response to determining that authentication notifications are disabled, prevent an authentication notification from being displayed on the user's mobile device;
   receive an out-of-band authentication communication from the user's mobile device that was prevented from displaying the authentication notification;
   determine that the mobile device that sent the out-of-band authentication communication is the same user's mobile device that was prevented from displaying the authentication notification and is therefore trusted to complete the multi-factor authentication of the user to the online service;
   in response to determining that the out-of-band authentication communication was received from a device trusted to complete the multi-factor authentication of the user to the online service, enable the user to login to the online service.

* * * * *